United States Statutory Invention Registration [19]

[11] Reg. Number: H515

Holt [43] Published: Aug. 2, 1988

[54] POLARIZED TARGET DETECTOR

[75] Inventor: Harold H. Holt, Huntsville, Ala.

[73] Assignee: The United States of America as represented by the Secretary of the Army, Washington, D.C.

[21] Appl. No.: 154,256

[22] Filed: Feb. 8, 1988

[51] Int. Cl.[4] ..... H04N 7/18

[52] U.S. Cl. ..... 358/108; 358/225

*Primary Examiner*—Stephen C. Buczinski
*Assistant Examiner*—Linda J. Wallace
*Attorney, Agent, or Firm*—John C. Garvin; Freddie M. Bush; James T. Deaton

[57] ABSTRACT

A system for enhancing targets by rotating a polarized filter in front of a TV tracker system to enable an operator to pick out and track targets more effectively from a cluttered background including trees, vegetation, and general landscape.

3 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

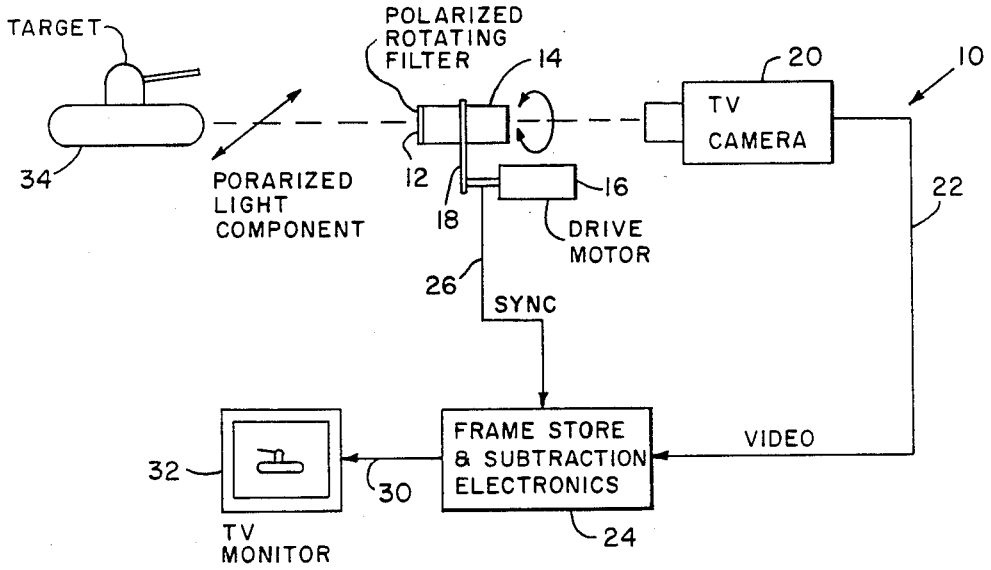
TARGET
POLARIZED ROTATING FILTER
14
20
10
TV CAMERA
34
PORARIZED LIGHT COMPONENT
12
18
16
DRIVE MOTOR
22
26
SYNC
FRAME STORE & SUBTRACTION ELECTRONICS
VIDEO
32
30
TV MONITOR
24

POLARIZED TARGET DETECTOR

DEDICATORY CLAUSE

The invention described herein may be manufactured, used, and licensed by or for the Government for governmental purposes without the payment to me of any royalties thereon.

BACKGROUND OF THE INVENTION

In the past, it has not always been possible to seek out a particular target by utilizing a TV camera and visualizing a target on a TV monitor from other cluttered background. In this particular area, there is a need for a device or method in which the target can be made to stand out and viewed more vividly on a TV monitor from the background clutter around the target.

Accordingly, it is an object of this invention to provide a method by which a target can be more vividly displayed on a TV monitor.

Another object of this invention is to provide a method that utilizes a polarized rotating filter that causes the target to be enhanced when viewed on a TV monitor.

Other objects and advantages of this invention would be obvious to those skilled in this art.

SUMMARY OF THE INVENTION

In accordance with this invention, a method of enhancing the image of a target is provided by rotating a polarized filter in front of a TV camera with the output from the TV camera connected to a frame store and subtraction electronics and with the drive motor for the filter also being connected to the frame store and subtraction electronics in order to have the filter and video output from the TV camera in sync and the information from the frame store and subtraction electronics then being fed to a TV monitor to vividly illustrate the target being detected.

BRIEF DESCRIPTION OF THE DRAWINGS

The single FIGURE of the drawing is a schematic illustration of a polarized target detector system in accordance with this invention.

DESCRIPTION OF THE PREFERRED EMBODIMENT

Referring now to the drawing, a polarized target detector system 10 includes a polarized filter 12 that is rotatably mounted in housing 14 and a motor 16 is mounted for driving through drive means 18 to drive housing 14 and polarized filter 12 at a rotational speed of about 2 to about 4 rps. Polarized filter 12 transmits light in the visible range from about 0.4 to about 0.7 microns. A conventional TV camera 20 is mounted in front of polarized filter 12 and has an output cable 22 connected thereto and to frame store and subtraction electronics 24. A link 26 connects rotary motion of motor 16 to frame store and subtraction electronics 24 so that video from store frame and subtraction electronics 24 can be synced to increase the detected difference in target polarized reflectivity. The output from frame store and subtraction electronics 24 is connected by output cable 30 to TV monitor 32.

In operation, polarized filter 12 is rotated by motor 16 with polarized filter 12 in front of TV camera 20 and as the polarized filter is rotated, polarized components of light reflected from a target such as target 34 go in and out of phase with the filter, and the target flickers against a randomly polarized background such as trees, vegetation, and general landscape to enable an operator to pick out and track the target more effectively from a cluttered background by viewing the target on TV monitor 32. As will be appreciated, this invention provides a system for enhancing targets utilizing a TV tracker system that enables an operator to pick out and track targets more effectively from a cluttered background. This system makes potential targets standout from the rest of the background. It is also noted that a target such as a tank has flat surfaces that cause polarized light components to flash or stand out from a neutral background. Utilization of the frame store and substraction electronics 24 in the system also increases target visibility thereby enabling a TV operator to more easily pick out targets.

I claim:

1. A system for enhancing targets viewed through a TV tracker system comprising, a TV camera mounted for viewing a target, said TV tracker being connected at its output to a frame store and subtraction electronics and said frame store and subtraction electronics being connected to a TV monitor, a polarized filter mounted in front of said TV camera and means for rotating said polarized filter at about 2 to about 4 revolutions per second, and interlocking means connecting said motor drive means to said frame store and subtraction electronics so that the rotation of the polarized filter and the frame store and subtraction electronics can be synced.

2. A method of enhancing targets viewed through a TV tracker system comprising rotating a polarized filter in front of a TV camera and between the camera and a target desired to be detected and utilizing the information from the TV camera on a TV monitor to display the target thereon.

3. A method as set forth in claim 2, wherein rotation of said polarized filter is synced with a frame store and subtration electronics before the image is displayed on the TV monitor.

* * * * *